US012791573B2

(12) United States Patent
Zuo et al.

(10) Patent No.: US 12,791,573 B2
(45) Date of Patent: Nov. 10, 2026

(54) WASTE LIQUID SUCTION MECHANISM, REACTION DISC, AND SAMPLE ANALYZER

(71) Applicant: ZYBIO INC., Chongqing (CN)

(72) Inventors: Jia Zuo, Chongqing (CN); Dexin Ma, Chongqing (CN); Qilei Liu, Chongqing (CN)

(73) Assignee: ZYBIO INC., Chongqing (CN)

( * ) Notice: Subject to any disclaimer, the term of this patent is extended or adjusted under 35 U.S.C. 154(b) by 458 days.

(21) Appl. No.: 18/505,048

(22) Filed: Nov. 8, 2023

(65) Prior Publication Data

US 2024/0077508 A1 Mar. 7, 2024

Related U.S. Application Data

(63) Continuation of application No. PCT/CN2022/108069, filed on Jul. 27, 2022.

(30) Foreign Application Priority Data

Aug. 2, 2021 (CN) ........................ 202110882669.8

(51) Int. Cl.

| | |
|---|---|
| ***B08B 5/04*** | (2006.01) |
| ***A47L 7/00*** | (2006.01) |
| ***A47L 9/00*** | (2006.01) |
| ***A47L 9/28*** | (2006.01) |
| ***G01N 35/00*** | (2006.01) |
| ***G01N 35/10*** | (2006.01) |

(52) U.S. Cl.

CPC ........ *G01N 35/1002* (2013.01); *A47L 7/0009* (2013.01); *A47L 7/0023* (2013.01); *A47L 9/0072* (2013.01); *A47L 9/2805* (2013.01); *B08B 5/04* (2013.01); *G01N 2035/00356* (2013.01); *G01N 35/1011* (2013.01)

(58) Field of Classification Search

CPC ........... G01N 35/1002; G01N 35/1011; G01N 2035/00356; G01N 2035/00277; G01N 35/10; G01N 33/50; G01N 35/00029; G01N 35/1004; A47L 7/0009; A47L 7/0023; A47L 9/0072; A47L 9/2805; B08B 5/04; B01L 3/0293; B01L 3/508; B01L 7/52

See application file for complete search history.

(56) References Cited

FOREIGN PATENT DOCUMENTS

| | | | |
|---|---|---|---|
| CN | 208334392 U | * | 1/2019 |
| CN | 209086262 U | * | 7/2019 |

* cited by examiner

*Primary Examiner* — Brian J. Sines

(57) ABSTRACT

A waste liquid suction mechanism, a reaction disc, and a sample analyzer are provided. The waste liquid suction mechanism includes: a driving assembly; a lifting assembly, performing lifting movement under the action of the driving assembly, where a guide block is disposed on the lifting assembly, and stroke positions of the lifting assembly include a trigger position and a release position located below the trigger position; a suction needle assembly, disposed on the lifting assembly and performing lifting movement along with the lifting assembly, and including a suction needle configured to suck waste liquid; and a collection assembly, disposed below the suction needle assembly, and including a rotary stopper configured to block or release the suction needle.

15 Claims, 5 Drawing Sheets

WASTE LIQUID SUCTION MECHANISM, REACTION DISC, AND SAMPLE ANALYZER

CROSS-REFERENCE

The present disclosure is a continuation application of International Patent Application No. PCT/CN2022/108069, filed on Jul. 27, 2022, and claiming the priority to Chinese Application No. 202110882669.8 filed on Aug. 2, 2021, the contents of all of which are incorporated herein by reference in their entirety.

TECHNICAL FIELD

The present disclosure belongs to the field of medical instrument technologies, and in particular, to a waste liquid suction mechanism, a reaction disc, and a sample analyzer.

BACKGROUND

Currently, a waste liquid suction apparatus may be configured to suck or separate a laboratory liquid sample, and is particularly suitable for sucking waste liquid obtained after detection. In the industry, most waste liquid suction apparatuses each have only one lifting stroke. A suction needle suspends above a reaction chamber after sucking waste liquid. A droplet, a waste liquid crystal, or the like accumulated on the suction needle for a long time is prone to fall into the reaction chamber randomly. If the droplet, the waste liquid crystal, or the like falls into to-be-detected reaction liquid, detection precision is affected. Consequently, such apparatuses often need to be maintained periodically.

In some other apparatuses, a horizontal mechanism is added, so that a suction needle can be horizontally put back after sucking waste liquid. Although a clean effect can be ensured, a large mounting space in a horizontal direction is occupied, and many movement execution members are required.

SUMMARY

In view of the foregoing disadvantages in the conventional technology, an objective of the present disclosure is to provide a waste liquid suction mechanism, a reaction disc, and a sample analyzer, to resolve a problem of a waste liquid suction apparatus in the conventional technology that a reaction chamber is contaminated by residual liquid and a crystal after reaction liquid detection, and reduce movement execution members.

To implement the foregoing objective and another related objective, the present disclosure provides a waste liquid suction mechanism, the waste liquid suction mechanism including:

- a driving assembly;
- a lifting assembly, performing lifting movement under the action of the driving assembly, where a guide block is disposed on the lifting assembly, and stroke positions of the lifting assembly include a trigger position and a release position located below the trigger position;
- a suction needle assembly, disposed on the lifting assembly and performing lifting movement along with the lifting assembly, and including a suction needle configured to suck waste liquid; and
- a collection assembly, disposed below the suction needle assembly, and including a rotary stopper configured to block or release the suction needle.

Further, after the lifting assembly moves up to the trigger position, the guide block enables the rotary stopper to rotate to block a liquid suction end of the suction needle; and after the lifting assembly moves down to the release position, the guide block releases force acting on the rotary stopper, the rotary stopper rotates and resets to release the liquid suction end of the suction needle, and the suction needle is capable of being lowered to perform liquid suction.

Further, the collection assembly further includes a power trigger, and the power trigger is disposed at one end of the rotary stopper; after the lifting assembly moves up to the trigger position, the guide block remains in contact with the power trigger, and pushes the power trigger to enable the rotary stopper to rotate; and after the lifting assembly moves down to the release position, the guide block continues to contact or is separated from the power trigger, and the rotary stopper resets.

Further, the power trigger is a guide idler hinged to the rotary stopper, and the guide idler is rotatably connected to one end of the rotary stopper by using a guide shaft.

Further, an inclined guide surface configured to contact the power trigger is disposed on the guide block, and an area of the inclined guide surface gradually increases in a direction gradually away from a position of the power trigger.

Further, the collection assembly further includes an elastic element, one end of the elastic element is fastened, and the other end of the elastic element is connected to the rotary stopper; after the lifting assembly moves up to the trigger position, the rotary stopper rotates to stretch the elastic element; and after the lifting assembly moves down to the release position, the elastic element resets, so that the rotary stopper rotates and resets.

Further, the rotary stopper has three extension parts extending outward from a center, the power trigger and the elastic element are respectively disposed on two of the extension parts, and a collection groove configured to collect a droplet at the liquid suction end of the suction needle is disposed on a top surface of the remaining extension part; and after the lifting assembly moves up to the trigger position, the rotary stopper rotates to align the collection groove with the suction needle.

Further, the collection assembly further includes a collection base plate, the rotary stopper is rotatably disposed on the collection base plate by using a rotary shaft, the elastic element is mounted on the collection base plate by using a fastening plate, and a waste liquid hole for the suction needle to pass through is disposed on the collection base plate; and after the lifting assembly moves down to the release position, the rotary stopper rotates to expose the waste liquid hole and align the waste liquid hole with the suction needle.

Further, the collection assembly further includes a light shielding hood, the light shielding hood is fastened on the collection base plate, the rotary shaft is rotatably connected to the light shielding hood, and a limiting baffle plate is disposed between a top part of the rotary shaft and the light shielding hood.

Further, the lifting assembly includes a lower fastening block, a support post, an upper fastening block, and a horizontal adjustment block, the support post is disposed on the lower fastening block, the guide block is disposed on the support post and the lower fastening block, the upper fastening block is disposed on a top part of the support post, the horizontal adjustment block is disposed on the upper fastening block, and the suction needle assembly is disposed on the horizontal adjustment block; and a rotation angle of the upper fastening block in a horizontal plane and a horizontal position of the horizontal adjustment block are adjusted, to adjust a horizontal position of the suction needle assembly.

Further, a tube passing channel for a waste liquid tube to pass through is disposed inside the support post.

Further, the suction needle assembly further includes a mounting block, a fastener, and a buffer element, the mounting block is disposed on the horizontal adjustment block, the fastener is threadedly connected to the mounting block, the buffer element is disposed in the fastener, and the suction needle passes through the buffer element and is fastened on the mounting block by using the fastener.

Further, the driving assembly includes a driving member, a connector, and a guide element, an output end of the driving member is connected to the guide element by using the connector, and the lifting assembly is mounted on the connector.

Further, the waste liquid suction mechanism further includes a detection assembly configured to detect a vertical position of the suction needle assembly, and the detection assembly includes a fixedly disposed sensing element and an induction element that moves along with the lifting assembly.

The present disclosure further provides a reaction disc, the reaction disc including a disc body, a heat preservation module, a reaction cup bearing module, and a waste liquid suction mechanism.

The heat preservation module is disposed on an outer side of the disc body, and is configured to enable the reaction disc to maintain a constant temperature to implement incubation in a reaction cup.

The reaction cup bearing module is mounted on an inner side of the disc body, and is configured to bear the reaction cup.

The waste liquid suction mechanism is mounted on a side surface of a top part of the disc body, and is configured to suck detected liquid, and the waste liquid suction mechanism is the waste liquid suction mechanism described above.

The present disclosure further provides a sample analyzer, the sample analyzer including a sampling needle module, a reagent disc module, a reaction disc module, and a detection module.

The sampling needle module is configured to suck a reagent or a sample and place the reagent or the sample in a reaction cup.

The reagent disc module is configured to store the reagent.

The reaction disc module is configured to incubate a to-be-detected substance, so that the to-be-detected substance meets a condition required for reaction of the reagent and the sample, and the reaction disc module includes the reaction disc described above.

The detection module is configured to detect the to-be-detected substance to obtain a detection result.

As described above, the present disclosure has the following beneficial effects:

Vertical lifting movement of the lifting assembly is converted into rotation movement of the rotary stopper by using the guide block. In this case, after the lifting assembly moves up to the trigger position, the rotary stopper rotates to block the liquid suction end of the suction needle; and after the lifting assembly moves down to the release position, the rotary stopper rotates and resets to release the liquid suction end of the suction needle. In the present disclosure, a problem that a reaction chamber is contaminated by residual liquid and a crystal after reaction liquid detection is resolved, movement execution members and driving members are reduced, costs are reduced, a mounting space is saved, and a mechanism structure is more compact.

DESCRIPTION OF REFERENCE NUMBERS OF PARTS

Figure 1:
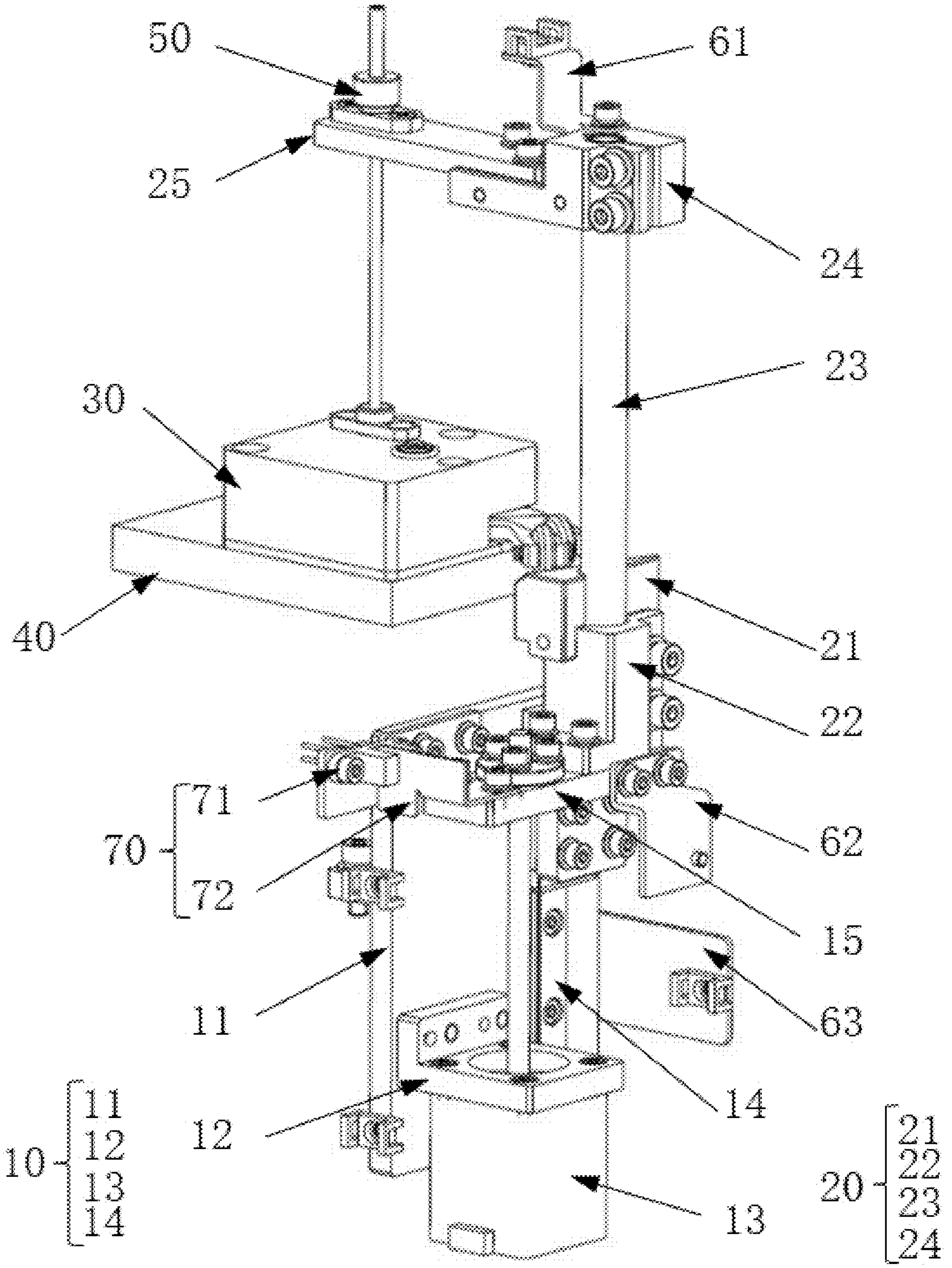
FIG. 1 is a schematic diagram of a structure of a waste liquid suction mechanism according to an embodiment of the present disclosure.

10—driving assembly; 11—mounting base; 12—mounting rack; 13—driving member; 14—guide element; 15—connector;

20—lifting assembly; 21—guide block; 21*a*—inclined guide surface; 22—lower fastening block; 23—support post; 24—upper fastening block; 25—horizontal adjustment block;

30—collection assembly; 301—collection base plate; 301*a*—waste liquid hole; 302—rotary stopper; 302*a*—first extension part; 302*b*—second extension part; 302*c*—third extension part; 3021—collection groove; 303—elastic element; 304—guide idler; 305—guide shaft; 306—rotary shaft; 307—fastening plate; 308—bearing; 309—light shielding hood; 309*a*—needle passing hole; 309*b*—avoidance notch; 310—limiting baffle plate;

40—base cover plate;

50—suction needle assembly; 501—mounting block; 502—fastener; 503—buffer element; 504—suction needle;

61—first fastening member; 62—second fastening member; 63—third fastening member;

70—detection assembly; 71—sensing element; 72—induction element; and

80—reaction disc.

DESCRIPTION OF EMBODIMENTS

The following describes implementations of the present disclosure by using particular specific embodiments. A person skilled in the art may easily understand other advantages and effects of the present disclosure from the content disclosed in this specification.

It should be noted that the structures, proportions, sizes, and the like shown in the accompanying drawings in this specification are merely used for cooperation with the content disclosed in this specification for understanding and reading by a person skilled in the art, and are not intended to limit the limitation conditions that can be implemented in the present disclosure. Therefore, the structures, proportions, sizes, and the like are not intended to be of a technical significance. Any structure modification, proportional relationship change, or size adjustment shall fall within the scope of the technical content disclosed by the present disclosure with a premise of not affecting an effect that can be generated by the present disclosure and an objective that can be achieved by the present disclosure. In addition, terms such as “upper”, “lower”, “left”, “right”, “middle”, and “one” that are referred in this specification are merely used for ease of description, and are not intended to limit the scope that can be implemented by the present disclosure. A change or adjustment of a relative relationship thereof also falls within the scope that can be implemented by the present disclosure with a premise of not changing the technical content substantially.

Refer to FIG. 1 to FIG. 4. The present disclosure provides a waste liquid suction mechanism, including:

a driving assembly 10;

a lifting assembly 20, performing lifting movement under the action of the driving assembly 10, where a guide block 21 is disposed on the lifting assembly 20, and stroke positions of the lifting assembly 20 include a trigger position and a release position located below the trigger position;

a suction needle assembly 50, disposed on the lifting assembly 20 and performing lifting movement along with the lifting assembly 20, and including a suction needle 504 configured to suck waste liquid; and a collection assembly 30, disposed below the suction needle assembly 50, and including a rotary stopper 302 configured to block or release the suction needle 504.

After the lifting assembly 20 moves up to the trigger position, the guide block 21 enables the rotary stopper 302 to rotate to block a liquid suction end of the suction needle 504; and after the lifting assembly 20 moves down to the release position, the guide block 21 releases force acting on the rotary stopper 302, the rotary stopper 302 rotates and resets to release the liquid suction end of the suction needle 504, and the suction needle 504 is capable of being lowered to perform liquid suction.

Specifically, vertical movement of the lifting assembly 20 is converted into rotation movement of the rotary stopper 302 by using the guide block 21 by using power of the driving assembly 10. In an upward movement process, the suction needle 504 moves up along with the lifting assembly 20, and the guide block 21 enables the rotary stopper 302 to rotate to block the liquid suction end of the suction needle 504, so that a droplet or a crystal of the suction needle 504 can be collected on the rotary stopper 302. In a downward movement process, the guide block 21 is separated from the rotary stopper 302, the rotary stopper 302 rotates and resets, and the suction needle 504 is lowered to enter a reaction chamber for liquid suction.

The collection assembly 30 further includes a power trigger, and the power trigger is disposed at one end of the rotary stopper 302.

In an initial state, the guide block 21 contacts the power trigger. After the lifting assembly 20 moves up to the trigger position, the guide block 21 still remains in contact with the power trigger, and the guide block 21 pushes the power trigger to enable the rotary stopper 302 to rotate. Alternatively, in an initial state, the guide block 21 does not contact the power trigger. After the lifting assembly 20 moves up to the trigger position, the guide block 21 is in contact with the power trigger, and the guide block 21 pushes the power trigger to enable the rotary stopper 302 to rotate.

After the lifting assembly 20 moves down to the release position, and when the guide block 21 continues to contact the power trigger without generating an acting force, the rotary stopper 302 resets. Alternatively, after the lifting assembly 20 moves down to the release position, the guide block 21 is separated from the power trigger, and the rotary stopper 302 resets.

In this embodiment, the power trigger is a guide idler 304 hinged to the rotary stopper 302, and the guide idler 304 is rotatably connected to one end of the rotary stopper 302 by using a guide shaft 305.

Figure 2:
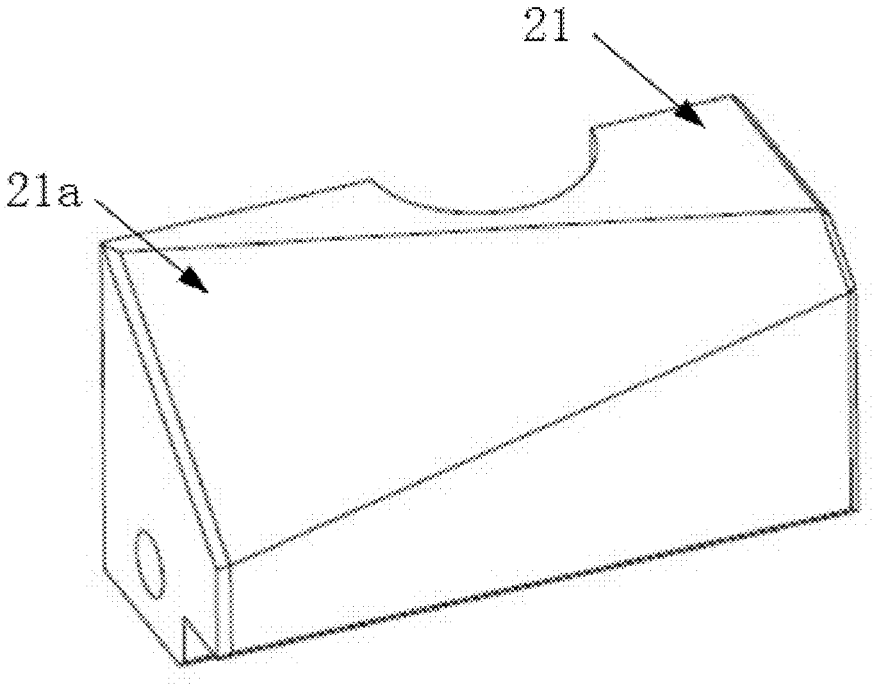
FIG. 2 is a schematic diagram of a structure of a guide block according to an embodiment of the present disclosure.

Refer to FIG. 2. An inclined guide surface 21*a* configured to contact the power trigger is disposed on the guide block 21, and an area of the inclined guide surface 21*a* gradually increases in a direction gradually away from a position of the power trigger. The guide block 21 contacts the guide idler 304 by using the inclined guide surface 21*a*. When the lifting assembly 20 is lifted, the guide idler 304 slides under the action of the inclined guide surface 21*a* of the guide block 21, so that the rotary stopper 302 rotates to block the suction needle 504. Otherwise, when the lifting assembly 20 is lowered, the guide idler 304 slides under the action of the inclined guide surface 21*a* of the guide block 21, so that the rotary stopper 302 rotates and resets to release the suction needle 504.

In this embodiment, the guide block 21 is made of a sliding plastic material, and has specific hardness, wear resistance, and small frictional resistance, thereby improving a function effect when the guide block 21 contacts the power trigger.

Figure 3:
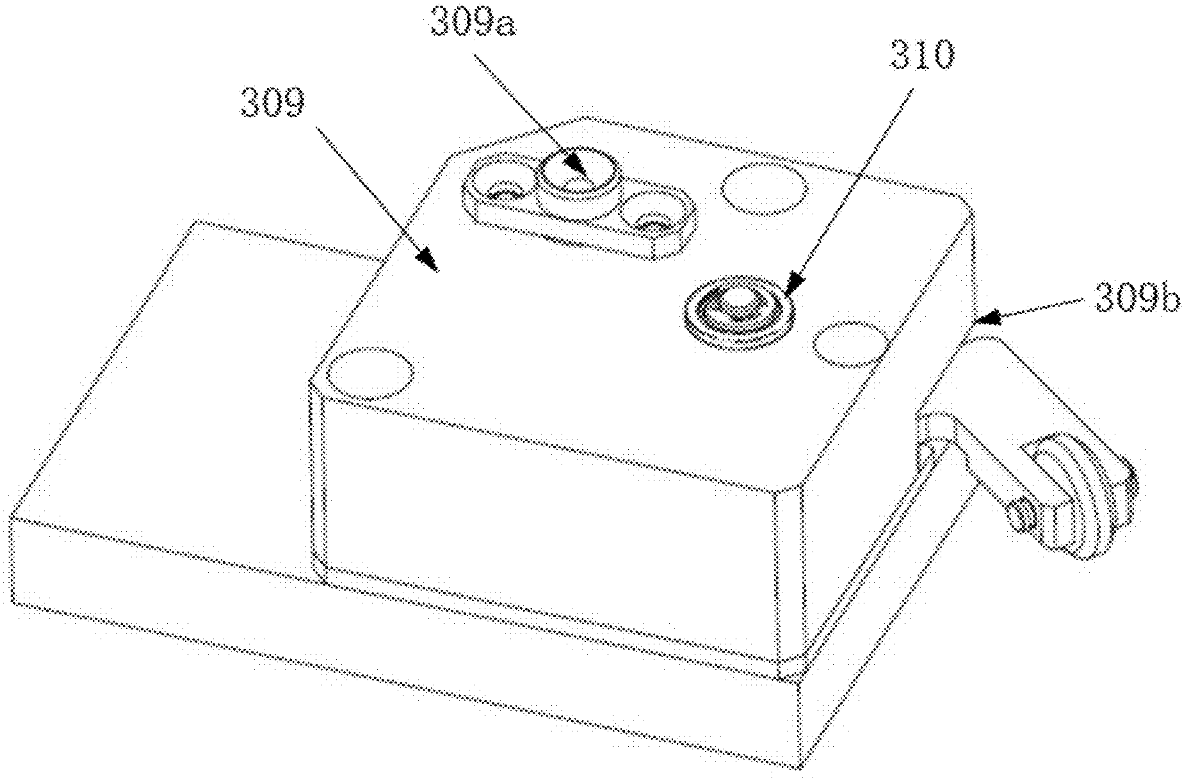
FIG. 3 is a schematic diagram of an external part of a collection assembly according to an embodiment of the present disclosure.
Figure 4:
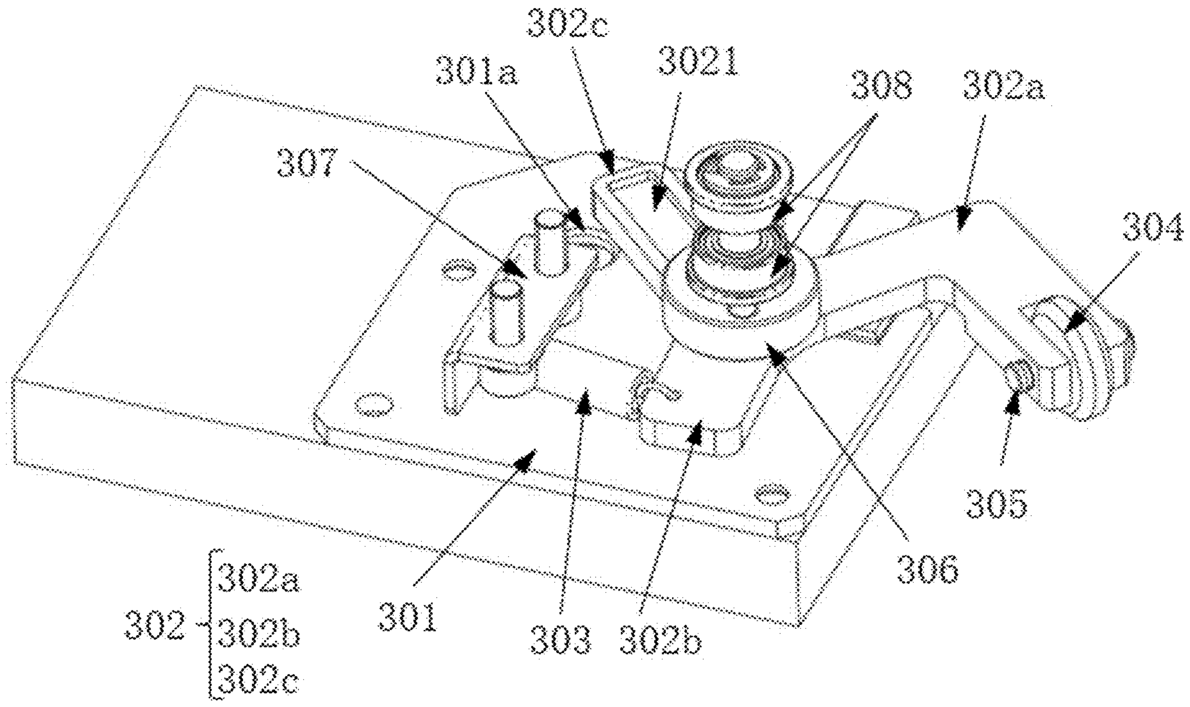
FIG. 4 is a schematic diagram of an internal part of a collection assembly according to an embodiment of the present disclosure.

In this embodiment, refer to FIG. 3 and FIG. 4. The collection assembly further includes an elastic element 303, one end of the elastic element 303 is fastened, and the other end of the elastic element 303 is connected to the rotary stopper 302. After the lifting assembly 20 moves up to the trigger position, the rotary stopper 302 rotates to stretch the elastic element 303. After the lifting assembly 20 moves down to the release position, the elastic element 303 resets, so that the rotary stopper 302 rotates and resets.

In this embodiment, the rotary stopper 302 has three extension parts extending outward from a center, the power trigger and the elastic element 303 are respectively disposed on two of the extension parts, and a collection groove 3021 configured to collect a droplet at the liquid suction end of the suction needle 504 is disposed on a top surface of the remaining extension part; and after the lifting assembly 20 moves up to the trigger position, the rotary stopper 302 rotates to align the collection groove 3021 with the suction needle 504. Specifically, the rotary stopper 302 has a first extension part 302*a*, a second extension part 302*b*, and a third extension part 302*c* that extend outward from a center, where the power trigger is disposed on the first extension part 302*a*, the first extension part 302*a* is in an L shape, one end of the first extension part 302*a* is connected to the center of the rotary stopper 302, and a U-shaped groove configured to mount the guide idler 304 is disposed at the other end of the first extension part 302*a*; the second extension part 302*b* is connected to the elastic element 303, and a connection hole configured to connect to the elastic element 303 is disposed on the second extension part 302*b*; and the collection groove 3021 is disposed on the third extension part 302*c*, and the collection groove 3021 may be disposed as a detachable structure, to facilitate periodic maintenance and replacement.

The collection assembly 30 further includes a collection base plate 301, the rotary stopper 302 is rotatably disposed on the collection base plate 301 by using a rotary shaft 306, the elastic element 303 is mounted on the collection base plate 301 by using a fastening plate 307, and a waste liquid hole 301*a* for the suction needle 504 to pass through is disposed on the collection base plate 301; and after the lifting assembly 20 moves down to the release position, the rotary stopper 302 rotates to expose the waste liquid hole 301*a* and align the waste liquid hole 301*a* with the suction needle 504. Specifically, the collection assembly 30 is configured to be mounted on a reaction disc 80. The collection base plate 301 is fastened on a base cover plate 40, and the base cover plate 40 is mounted on the reaction disc 80. The fastening plate 307 is in an L shape, one end of the fastening plate 307 is fastened on the collection base plate 301, and a fastening post is disposed on the other end of the fastening plate 307. The elastic element 303 is connected to the fastening plate 307 by using the fastening post. In a natural state, the waste liquid hole 301*a* is not shielded above, and is in an opened state. The suction needle 504 may pass through the waste liquid hole 301*a* to suck waste liquid in the reaction disc 80. After the lifting assembly 20 moves up to the trigger position, the rotary stopper 302 rotates under the action of the guide block 21, to shield the waste liquid hole 301*a* and block the liquid suction end of the suction needle 504. After the lifting assembly 20 moves down to the release position, the rotary stopper 302 rotates and resets under the action of the elastic element 303 to expose the waste liquid hole 301*a*, and the suction needle 504 can be lowered to enter the waste liquid hole 301*a* to suck the waste liquid.

In this embodiment, the collection base plate 301 is made of a sliding plastic material, and has small surface resistance, specific hardness, and wear resistance, ensuring that the rotary stopper 302 can rotate freely on the collection base plate 301. The rotary stopper 302 is also made of a sliding plastic material, and has thermal conductivity, making it convenient to transfer heat of the reaction disc 80, to evaporate accumulated waste liquid.

Preferably, the collection assembly 30 further includes a light shielding hood 309, the light shielding hood 309 is fastened on the collection base plate 301, the rotary shaft 306 is rotatably connected to the light shielding hood 309, and a limiting baffle plate 310 is disposed between a top part of the rotary shaft 306 and the light shielding hood 309. Specifically, a needle passing hole 309*a* is disposed at a position that is on a top part of the light shielding hood 309 and that is aligned with the waste liquid hole 301*a* on the collection base plate 301, so that the suction needle 504 passes through the needle passing hole 309*a*. The rotary shaft 306 is rotatably connected to the light shielding hood 309 by using bearings 308, to ensure smooth rotation of the rotary shaft 306. An avoidance notch 309*b* for rotation of the rotary stopper 302 is disposed on a bottom part of the light shielding hood 309, and the first extension part 302*a* that is on the rotary stopper 302 and on which the power trigger is mounted extends from the avoidance notch 309*b*.

In this embodiment, the light shielding hood 309 is made of an aluminum alloy material. An internal size of the light shielding hood 309 matches an external size of the rotary stopper 302, and internal and external surfaces are oxidized to be black to play a light shielding function, thereby protecting internal collected waste liquid.

The driving assembly 10 includes a driving member 13, a connector 15, and a guide element 14, an output end of the driving member 13 is connected to the guide element 14 by using the connector 15, and the lifting assembly 20 is mounted on the connector 15. In this embodiment, the driving member 13 is fastened on a mounting base 11 by using a mounting rack 12, the mounting base 11 is fastened on a substrate, the guide element 14 is disposed on the mounting base 11, and the guide element 14 may be of a guide rail-slider combined structure, and is configured to provide the connector 15 with guide support, to enhance stability of the connector 15 in reciprocal movement. The driving member 13 may be an air cylinder, an oil cylinder, or the like. The output end of the driving member 13 drives the connector 15 and the lifting assembly 20 disposed on the connector 15 to perform reciprocal lifting movement.

In this embodiment, the lifting assembly 20 includes a lower fastening block 22, a support post 23, an upper fastening block 24, and a horizontal adjustment block 25, the support post 23 is disposed on the lower fastening block 22, the guide block 21 is disposed on the support post 23 and the lower fastening block 22, the upper fastening block 24 is disposed on a top part of the support post 23, the horizontal adjustment block 25 is disposed on the upper fastening block 24, and the suction needle assembly 50 is disposed on the horizontal adjustment block 25; and an adjustment of a rotation angle of the upper fastening block 24 in a horizontal plane and a horizontal position of the horizontal adjustment block 25 may capable of adjusting a horizontal position of the suction needle assembly 50. Specifically, the lower fastening block 22 is fastened on the connector 15, and the upper fastening block 24 is mounted on the support post 23 by using an adjustment member. In a mounting process, if the suction needle 504 cannot be accurately aligned with the waste liquid hole 301*a* due to a mounting error (that is, the horizontal position changes), only a mounting structure of the upper fastening block 24 needs to be loosened in this case, so that the horizontal position of the suction needle 504 can be adjusted.

In this embodiment, a tube passing channel for a waste liquid tube to pass through is disposed inside the support post 23. This structure is convenient for the waste liquid tube to pass through the support post 23, thereby saving a space.

In addition, the waste liquid suction mechanism further includes a plurality of fastening members configured to fasten the waste liquid tube, and a fastening clamp is disposed on the fastening member. In this embodiment, a first fastening member 61 is mounted on the upper fastening block 24, a second fastening member 62 is mounted on the connector 15, and a third fastening member 63 is mounted on the mounting base 11. In another embodiment, the fastening members may be arranged based on actual costs and a tube arrangement requirement.

Figure 5:
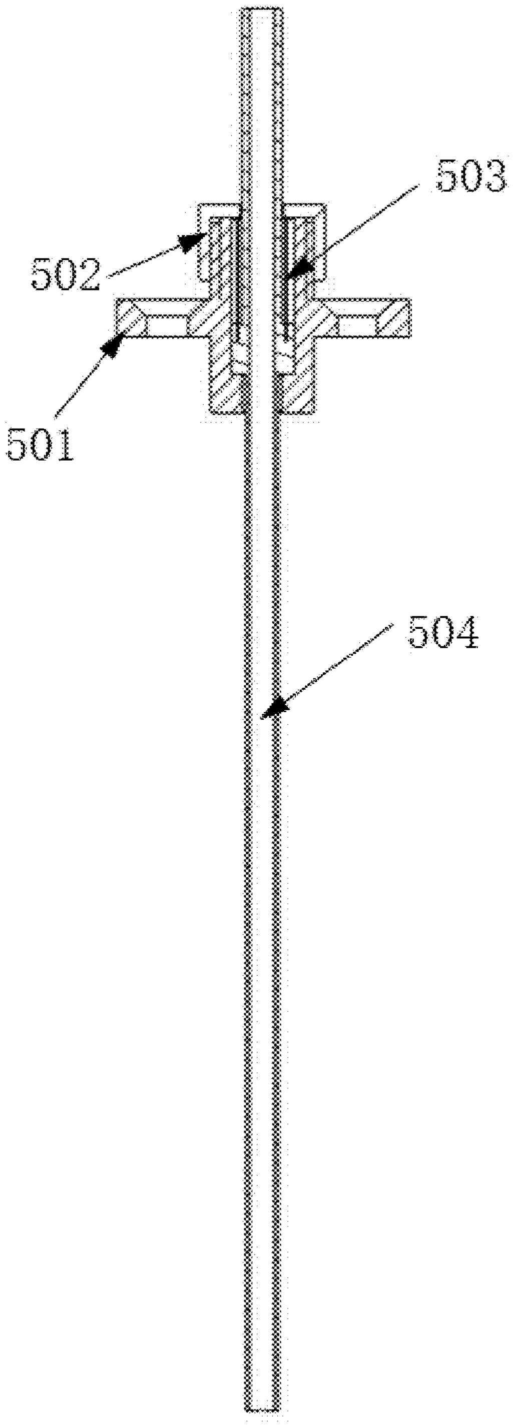
FIG. 5 is a schematic diagram of a structure of a suction needle assembly according to an embodiment of the present disclosure.

Refer to FIG. 5. The suction needle assembly 50 further includes a mounting block 501, a fastener 502, and a buffer element 503, the mounting block 501 is disposed on the horizontal adjustment block 25, the fastener 502 is threadedly connected to the mounting block 501, the buffer element 503 is disposed in the fastener 502, and the suction needle 504 passes through the buffer element 503 and is fastened on the mounting block 501 by using the fastener 502. In this embodiment, the fastener 502 may be a nut. The mounting block 501 includes a threaded part, a limiting part, and a clamping part that are connected in sequence, the threaded part is threadedly connected to the nut, the clamping part is clamped into the horizontal adjustment block 25, and the limiting part is connected and fastened to the horizontal adjustment block 25 by using a bolt. In this structure, the fastener 502 is threadedly connected to the mounting block 501, so that the suction needle 504 can be replaced at any time based on a use condition. By disposing the buffer element 503, buffer and anti-collision functions can be implemented when the suction needle 504 encounters resistance while descending.

In addition, still refer to FIG. 1. The waste liquid suction mechanism further includes a detection assembly 70 configured to detect a vertical position of the suction needle assembly 50, and the detection assembly 70 includes a fixedly disposed sensing element 71 and an induction element 72 that moves along with the lifting assembly 20. In this embodiment, the sensing element 71 is fastened on the mounting base 11 by using the mounting block 501, the induction element 72 is fastened on the connector 15, and the induction element 72 is located at one end of the connector 15 close to the sensing element 71.

Figure 6:
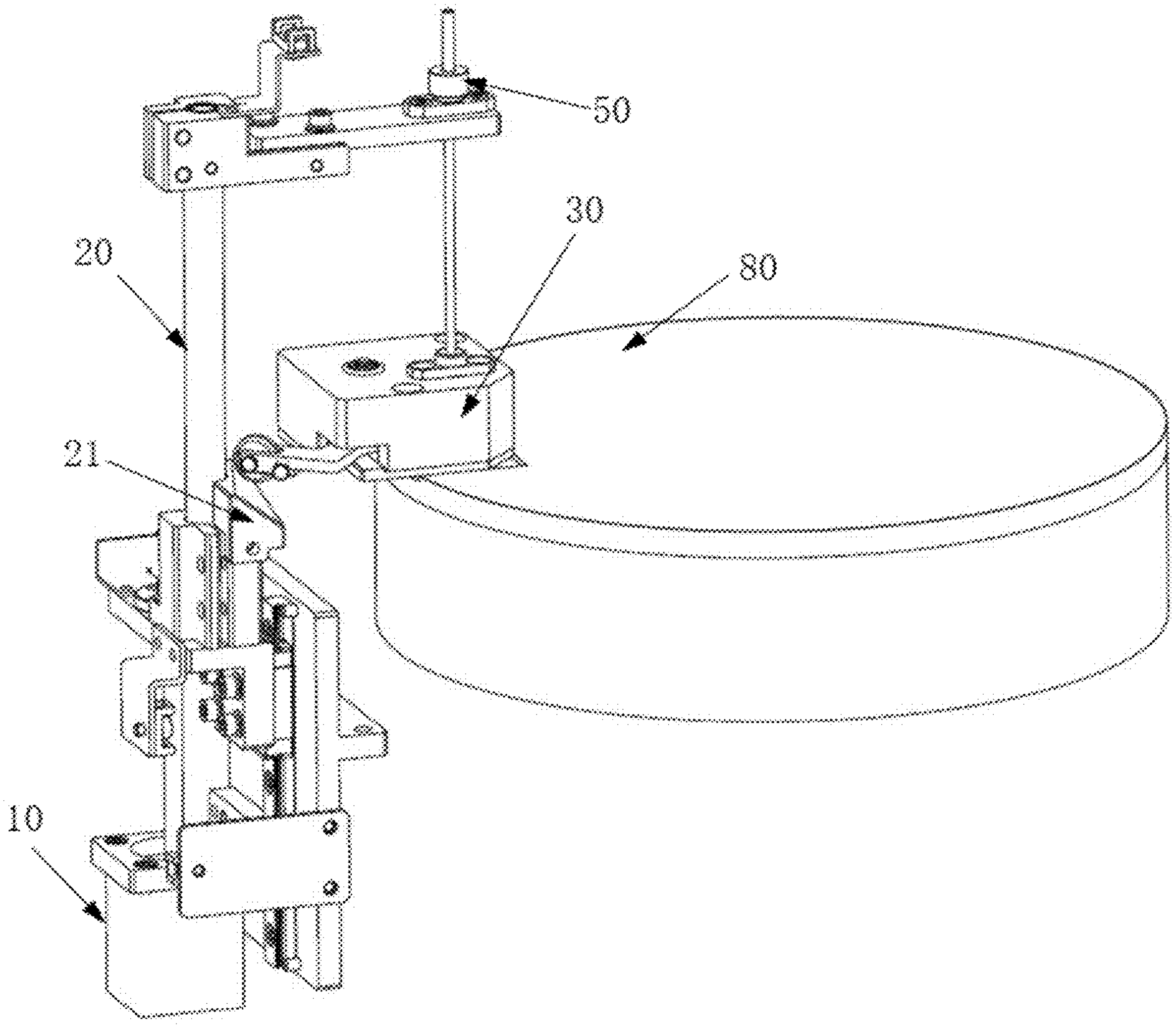
FIG. 6 is a schematic diagram of a structure obtained after a waste liquid suction mechanism is applied to a reaction disc according to an embodiment of the present disclosure.

Refer to FIG. 1 and FIG. 6. A specific use process of the present disclosure is as follows: In a waste liquid suction process, the driving member 13 drives the guide block 21 and the suction needle 504 to move up together. After the lifting assembly 20 reaches the trigger position, the guide block 21 contacts the guide idler 304 on the rotary stopper 302. In a continuous upward movement process, the guide idler 304 is pushed to enable the rotary stopper 302 to rotate at a specific angle, and the elastic element 303 is stretched. In this case, the suction needle 504 is also lifted to a specific position, and the rotary stopper 302 blocks the liquid suction end of the suction needle 504, so that a droplet or a crystal block on the suction needle 504 is collected on the collection groove 3021 of the rotary stopper 302, thereby preventing the reaction chamber from being contaminated. When the driving member 13 drives the guide block 21 and the suction needle 504 to move down together, after the lifting assembly 20 reaches the release position, the guide block 21 is separated from the guide idler 304 on the rotary stopper 302, an elastic force of the elastic element 303 enables the rotary stopper 302 to rotate and reset to expose the waste liquid hole 301*a* on the collection base plate 301, and the suction needle 504 is lowered to enter the waste liquid hole 301*a*, to enter the reaction disc 80 for liquid suction.

The present disclosure further provides a reaction disc, including a disc body, a heat preservation module, a reaction cup bearing module, and a waste liquid suction mechanism.

The heat preservation module is disposed on an outer side of the disc body, and is configured to enable the reaction disc to maintain a constant temperature to implement incubation in a reaction cup.

The reaction cup bearing module is mounted on an inner side of the disc body, and is configured to bear the reaction cup.

The waste liquid suction mechanism is mounted on a side surface of a top part of the disc body, and is configured to suck detected liquid, and the waste liquid suction mechanism is the waste liquid suction mechanism described above.

The present disclosure further provides a sample analyzer, including a sampling needle module, a reagent disc module, a reaction disc module, and a detection module.

The sampling needle module is configured to suck a reagent or a sample and place the reagent or the sample in a reaction cup.

The reagent disc module is configured to store the reagent.

The reaction disc module is configured to incubate a to-be-detected substance, so that the to-be-detected substance meets a condition required for reaction of the reagent and the sample, and the reaction disc module includes the reaction disc described above.

The detection module is configured to detect the to-be-detected substance to obtain a detection result.

In conclusion, in the waste liquid suction mechanism, the reaction disc, and the sample analyzer provided in the embodiments of the present disclosure, vertical lifting movement of the lifting assembly is converted into rotation movement of the rotary stopper by using the guide block. In this case, after the lifting assembly moves up to the trigger position, the rotary stopper rotates to block the liquid suction end of the suction needle; and after the lifting assembly moves down to the release position, the rotary stopper rotates and resets to release the liquid suction end of the suction needle. In the present disclosure, a problem that the reaction chamber is contaminated by residual liquid and a crystal after reaction liquid detection is resolved, movement execution members and driving members are reduced, costs are reduced, a mounting space is saved, and a mechanism structure is more compact.

The foregoing embodiments merely illustrate principles and functions of the present disclosure, but are not intended to limit the present disclosure. Any person skilled in the art may modify or alter the foregoing embodiments without departing from the scope of the present disclosure. Therefore, all equivalent modifications or alterations completed by a person of ordinary skill in the art without departing from the technical ideas disclosed in the present disclosure shall still be covered by the claims of the present disclosure.

What is claimed is:

1. A waste liquid suction mechanism, comprising:

a driving assembly;

a lifting assembly, performing lifting movement under an action of the driving assembly, wherein a guide block is disposed on the lifting assembly, and stroke positions of the lifting assembly comprise a trigger position and a release position located below the trigger position;

a suction needle assembly, disposed on the lifting assembly and performing lifting movement along with the lifting assembly, and comprising a suction needle configured to suck waste liquid; and a collection assembly, disposed below the suction needle assembly, and comprising a rotary stopper configured to block or release the suction needle;

wherein after the lifting assembly moves up to the trigger position, the guide block enables the rotary stopper to rotate to block a liquid suction end of the suction needle; and after the lifting assembly moves down to the release position, the guide block releases force acting on the rotary stopper, the rotary stopper rotates and resets to release the liquid suction end of the suction needle, and the suction needle is capable of being lowered to perform liquid suction.

2. The waste liquid suction mechanism according to claim 1, wherein the collection assembly further comprises a power trigger, and the power trigger is disposed at one end of the rotary stopper; after the lifting assembly moves up to the trigger position, the guide block remains in contact with the power trigger, and pushes the power trigger to enable the rotary stopper to rotate; and after the lifting assembly moves down to the release position, the guide block continues to contact or is separated from the power trigger, and the rotary stopper resets.

3. The waste liquid suction mechanism according to claim 2, wherein the power trigger is a guide idler hinged to the rotary stopper, and the guide idler is rotatably connected to one end of the rotary stopper by using a guide shaft.

4. The waste liquid suction mechanism according to claim 2, wherein an inclined guide surface configured to contact the power trigger is disposed on the guide block, and an area of the inclined guide surface gradually increases in a direction gradually away from a position of the power trigger.

5. The waste liquid suction mechanism according to claim 2, wherein the collection assembly further comprises an elastic element, a first end of the elastic element is fastened, and a second end of the elastic element is connected to the rotary stopper; after the lifting assembly moves up to the trigger position, the rotary stopper rotates to stretch the elastic element; and after the lifting assembly moves down to the release position, the elastic element resets, so that the rotary stopper rotates and resets.

6. The waste liquid suction mechanism according to claim 5, wherein the rotary stopper has three extension parts extending outward from a center, the power trigger and the elastic element are respectively disposed on two of the extension parts, and a collection groove configured to collect a droplet at the liquid suction end of the suction needle is disposed on a top surface of the remaining extension part; and after the lifting assembly moves up to the trigger position, the rotary stopper rotates to align the collection groove with the suction needle.

7. The waste liquid suction mechanism according to claim 5, wherein the collection assembly further comprises a collection base plate, the rotary stopper is rotatably disposed on the collection base plate by using a rotary shaft, the elastic element is mounted on the collection base plate by using a fastening plate, and a waste liquid hole for the suction needle to pass through is disposed on the collection base plate; and after the lifting assembly moves down to the release position, the rotary stopper rotates to expose the waste liquid hole and align the waste liquid hole with the suction needle.

8. The waste liquid suction mechanism according to claim 7, wherein the collection assembly further comprises a light shielding hood, the light shielding hood is fastened on the collection base plate, the rotary shaft is rotatably connected to the light shielding hood, and a limiting baffle plate is disposed between a top part of the rotary shaft and the light shielding hood.

9. The waste liquid suction mechanism according to claim 1, wherein the lifting assembly comprises a lower fastening block, a support post, an upper fastening block, and a horizontal adjustment block, the support post is disposed on the lower fastening block, the guide block is disposed on the support post and the lower fastening block, the upper fastening block is disposed on a top part of the support post, the horizontal adjustment block is disposed on the upper fastening block, and the suction needle assembly is disposed on the horizontal adjustment block; and a rotation angle of the upper fastening block in a horizontal plane and a horizontal position of the horizontal adjustment block are adjusted, to adjust a horizontal position of the suction needle assembly.

10. The waste liquid suction mechanism according to claim 9, wherein a tube passing channel for a waste liquid tube to pass through is disposed inside the support post.

11. The waste liquid suction mechanism according to claim 9, wherein the suction needle assembly further comprises a mounting block, a fastener, and a buffer element, the mounting block is disposed on the horizontal adjustment block, the fastener is threadedly connected to the mounting block, the buffer element is disposed in the fastener, and the suction needle passes through the buffer element and is fastened on the mounting block by using the fastener.

12. The waste liquid suction mechanism according to claim 1, wherein the driving assembly comprises a driving member, a connector, and a guide element, an output end of the driving member is connected to the guide element by using the connector, and the lifting assembly is mounted on the connector.

13. The waste liquid suction mechanism according to claim 1, wherein the waste liquid suction mechanism further comprises a detection assembly configured to detect a vertical position of the suction needle assembly, and the detection assembly comprises a fixedly disposed sensing element and an induction element that moves along with the lifting assembly.

14. A reaction disc, comprising a disc body, a heat preservation module, a reaction cup bearing module, and a waste liquid suction mechanism, wherein the heat preservation module is disposed on an outer side of the disc body, and is configured to enable the reaction disc to maintain a constant temperature to implement incubation in a reaction cup;

the reaction cup bearing module is mounted on an inner side of the disc body, and is configured to bear the reaction cup; and the waste liquid suction mechanism is mounted on a side surface of a top part of the disc body, and is configured to suck detected liquid, and the waste liquid suction mechanism is the waste liquid suction mechanism according to claim 1.

15. A sample analyzer, comprising a sampling needle module, a reagent disc module, a reaction disc module, and a detection module, wherein the sampling needle module is configured to suck a reagent or a sample and place the reagent or the sample in a reaction cup;

the reagent disc module is configured to store the reagent;

the reaction disc module is configured to incubate a to-be-detected substance, so that the to-be-detected substance meets a condition required for reaction of the reagent and the sample, and the reaction disc module comprises the reaction disc according to claim 14; and the detection module is configured to detect the to-be-detected substance to obtain a detection result.

* * * * *